UNITED STATES PATENT OFFICE.

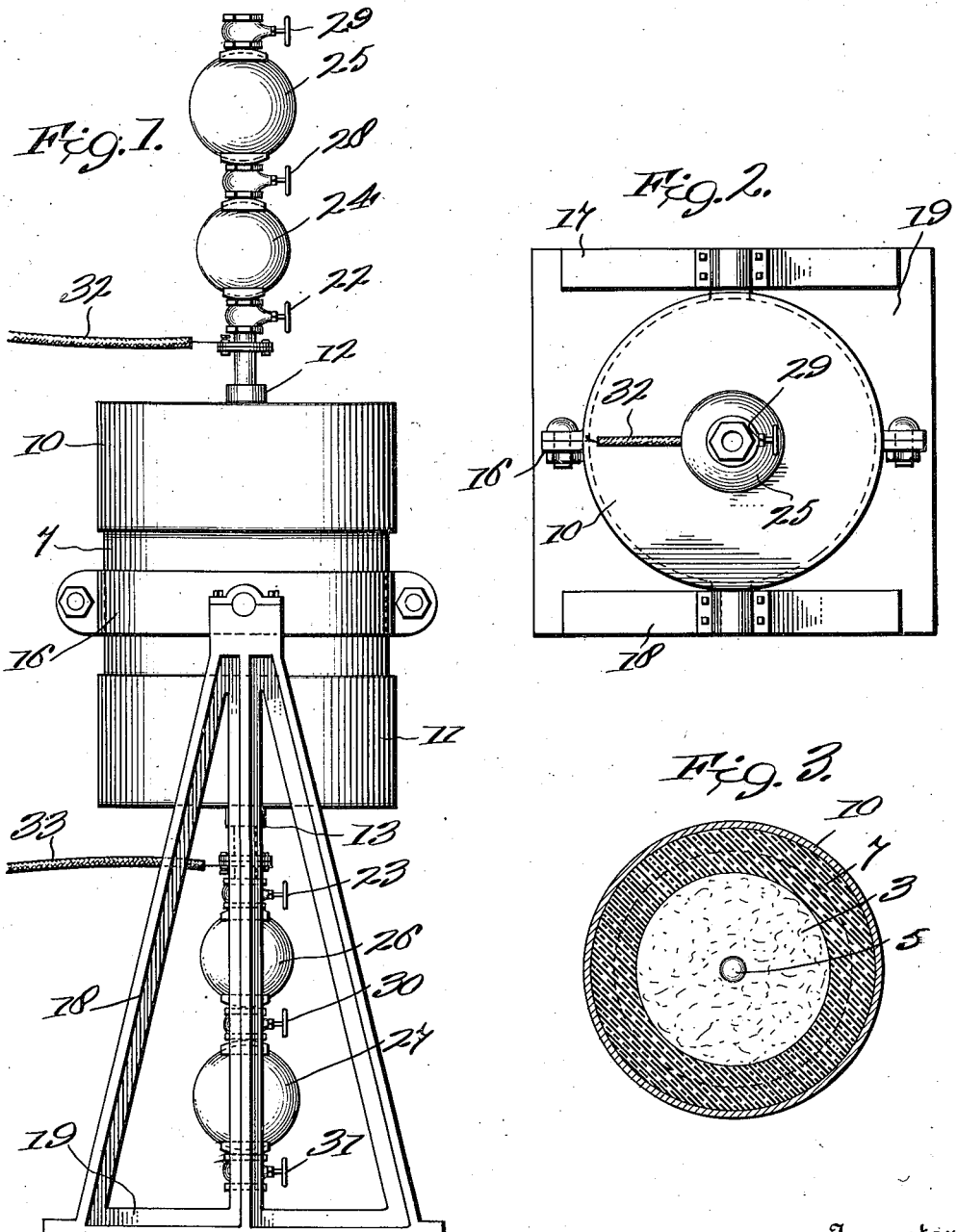

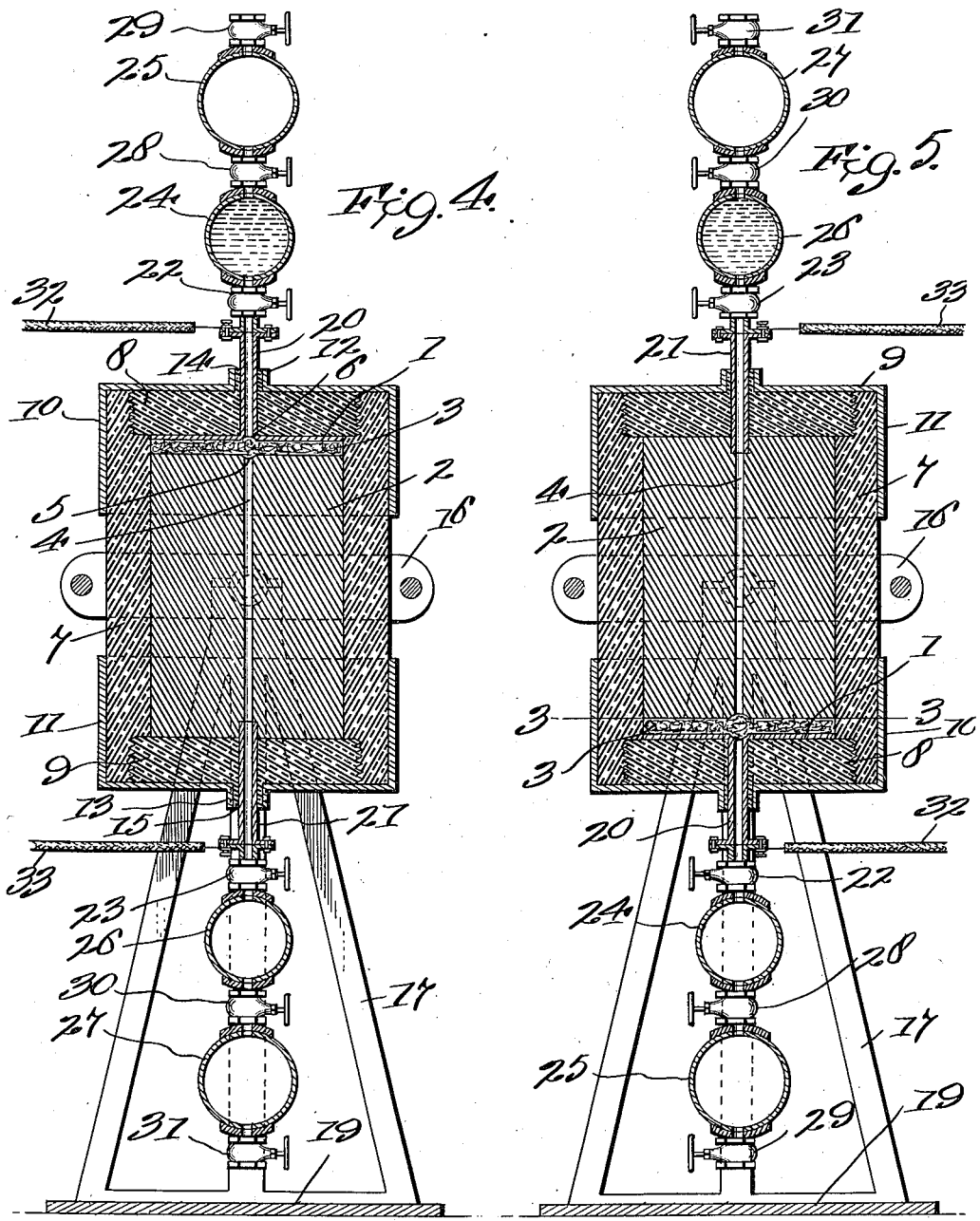

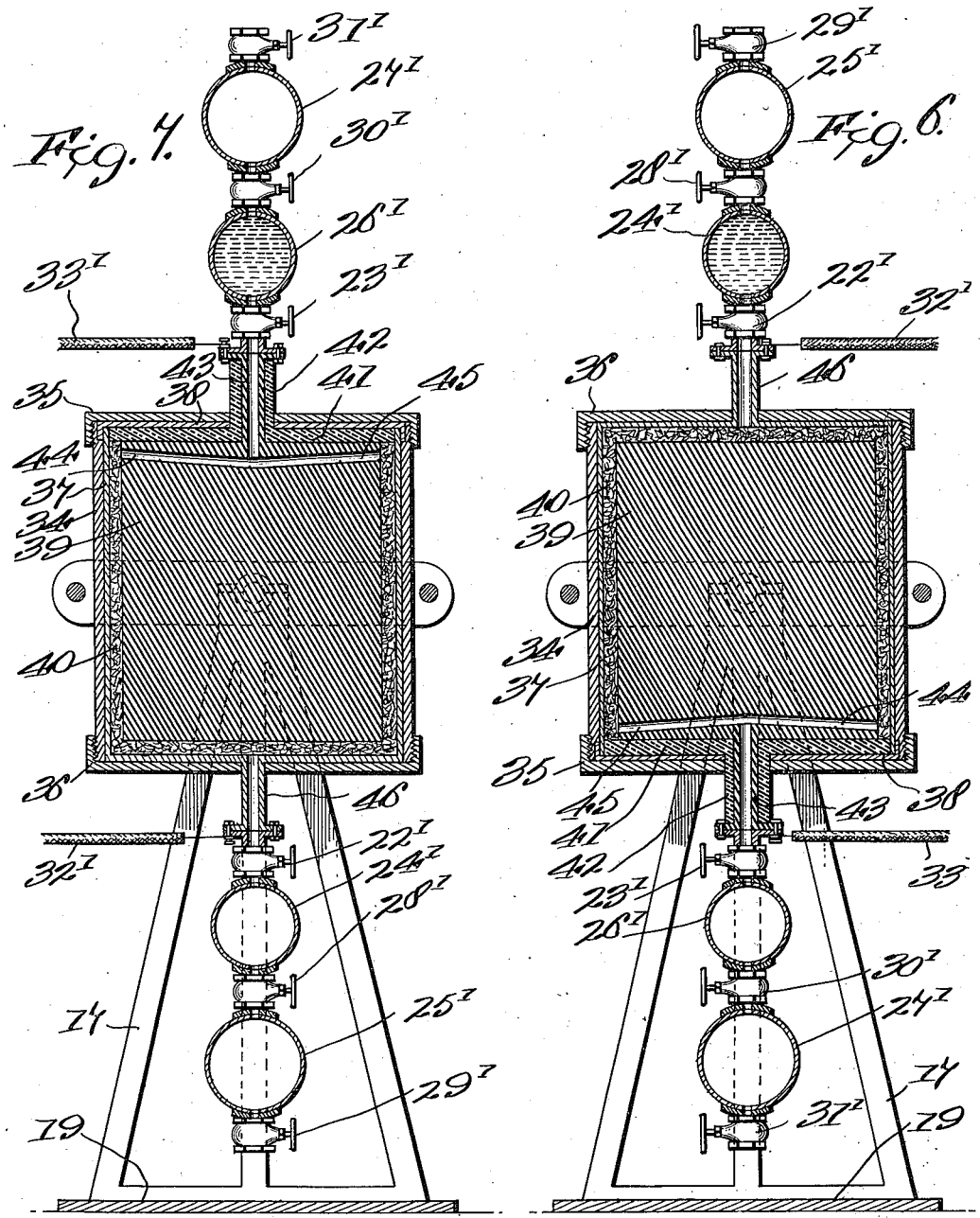

PHILIP A. EMANUEL, OF AIKEN, SOUTH CAROLINA.

METHOD OF REGENERATING ELECTRIC BATTERIES.

1,190,879.        Specification of Letters Patent.      Patented July 11, 1916.

Original application filed November 5, 1915, Serial No. 59,838. Divided and this application filed December 6, 1915. Serial No. 65,330.

*To all whom it may concern:*

Be it known that I, PHILIP A. EMANUEL, a citizen of the United States, residing at Aiken, in the county of Aiken and State of South Carolina, have invented certain new and useful Improvements in Methods of Regenerating Electric Batteries; and I do hereby declare the following to be a full, clear, and exact description of the invention, such as will enable others skilled in the art to which it appertains to make and use the same.

The present invention relates to improvements in methods of regenerating electric batteries, and the subject-matter hereof is a division of my co-pending application entitled "Improvements in electric batteries", filed November 5, 1915, Serial No. 59838; reference being had herein to my prior Patent No. 615,539, granted December 6, 1898, and entitled "Electric battery".

Among a number of objects, which will readily suggest themselves to those skilled in the art, the present invention proposes to provide an electric battery or cell which will yield a substantially constant current without that rapidly diminishing intensity common to present types of batteries.

The invention further aims to remove the zinc sulfate or other salt periodically as the same is formed, and which has been found objectionable as congesting the cell and interfering with the action therein; the zinc sulfate or other salt being carried off by water which is formed at the positive plate by union of the freed hydrogen with the oxygen of a depolarizer, and which maintains the positive plate clear; said action of the cell reducing the local action set up by impurities in the zinc electrode.

It is the purpose and intention of my present invention to provide an improved cell in which the above objections will not prevail, and which shall be capable of regeneration after the electrolyte has become converted and the negative electrode considerably decomposed.

In the accompanying drawings forming a part of this application, and in which similar reference symbols indicate corresponding parts in the several views: Figure 1 is a side elevational view of an improved electric battery constructed in accordance with the present invention. Fig. 2 is a top plan view of the same. Fig. 3 is a transverse sectional view taken on the line 3—3 in Fig. 5, and with the support removed. Fig. 4 is a vertical sectional view of one form of the invention, and in position for operation. Fig. 5 is a similar view illustrating the device as inverted for regeneration. Fig. 6 is a vertical sectional view of a slightly modified form of the invention; and Fig. 7 is a similar view in the inverted position for regeneration.

Referring more particularly to the device shown in Figs. 1 to 5 of the drawings, 1 and 2 designate respectively, the positive and negative electrodes, which may be of any of the materials necessary to constitute a voltaic couple, and for purposes of description the same will be referred to as copper and zinc. The positive electrode 1 is preferably a relatively thin disk which is platinized and separated from the negative electrode 2 by a porous disk 3.

The negative electrode 2 and porous disk 3 are similar to the corresponding elements in my prior patent above, the electrode being traversed by a central duct 4, in alinement with a perforation in the positive electrode 1; and the porous disk 3 is formed with beads 5 and 6 on its upper and lower faces, which are glazed or otherwise treated to prevent the passage of the electrolyte through the porous disk at this point.

The electrodes 1 and 2, together with the porous disk 3 are fitted in a jar or container 7, which is advantageously of gutta-percha, or other suitable insulating material. While the container 7 may be of any shape found desirable or necessary, the same is preferably of the cylindrical form shown in the drawings, with the enlarged bore at either end threaded to receive inclosing heads 8 and 9. The inclosing heads 8 and 9 are flush with the ends of the container 7, and are confined in place and the device bound together by metallic cap plates 10 and 11 embracing the ends of the container, and formed with collars 12 and 13 surrounding flanges 14 and 15 on the heads 8 and 9.

The container 7 is encircled centrally by a divided ring 16 provided with trunnions fitted in bearings on the upper ends of standards or supports 17 and 18 on a base 19, for mounting the battery to swing to inverted position as hereinafter more fully described.

The positive electrode 1 is connected in the external circuit by a tubular pole-piece 20, passing through the head 8 and flange 14, and insulated from the adjacent cap plate 10. Similarly, the negative electrode 2 is connected in the external circuit by means of a tubular pole-piece 21, passing through the opposite head 9 and flange 15, which insulate the same from the cap plate 11. The pole-pieces 20 and 21 are provided with flanges for engagement by similar flanges on valve casings 22 and 23, the same being connected in turn to pairs of receptacles 24, 25 and 26, 27.

The upper receptacles or vessels 24 and 25 are connected together through a valve casing 28, and the upper vessel 25 is provided with a similar valve casing 29 for controlling admission of fluid thereto, as will be presently explained. Valve casings 30 and 31 are similarly arranged in connection with the vessels 26 and 27 mounted at the lower end of the battery. Leads 32 and 33 are secured to binding posts associated with the flanges of the pole-pieces, and are connected to provide an external circuit in a well known manner.

In the operation of the improved battery as above described, the container 7 is in the upright position illustrated in Fig. 4, the vessel 24 having been previously charged with an electrolyte of any suitable character, for instance, dilute sulfuric acid, and the remaining receptacles 25, 26 and 27, with a depolarizer, such as gaseous oxygen, nitric acid, or depolarizer which will not chemically combine with sulfuric acid under ordinary temperatures. The depolarizer in the vessel 25 is under pressure, while that in the vessels 26 and 27 is not necessarily so. It will be understood that the electrolyte may be introduced into the vessel 24 by opening both valves 28 and 29 and pouring the same in through the vessel 25; the valve 22, leading to the battery, being, of course, closed. After the electrolyte has been thus introduced, the valve 28 is closed, and oxygen under pressure is admitted through the valve 29 into the receptacle 25, whereupon said valve is closed. In a similar manner the vessels 26 and 27 on the lower end of the battery, may be charged with a depolarizer by manipulation of the valves 30 and 31, and it will be remembered that the depolarizer in these receptacles need not be under pressure.

To start the battery into operation, referring now still to Fig. 4, of the drawings, the valve 22 is opened to the required degree to permit the electrolyte from the vessel 24 to descend through the tubular pole-piece 20 and into contact with the upper glazed bead 6 on the porous disk 3, which intercepts its passage and diverts the same into contact with the lower face of the platinized positive electrode 1. Simultaneously with this action, the gaseous oxygen, or other depolarizer in the receptacle 25, is admitted to the lower vessel 24 by opening the valve 28, and such depolarizer, which is under pressure, operates to force the electrolyte down into the battery and into active contact with the electrodes. The depolarizer thus becomes mixed throughout the electrolyte and provides for a forced circulation thereof throughout the battery, placing said electrolyte under pressure, and thereby insuring improved galvanic action, productive of increased voltage.

It will be understood, by reference more particularly to my above-mentioned prior patent, that the electrolyte passes through the porous disk 3 from the under face of the electrode 1, and down into contact with the upper face of the negative electrode 2. The zinc sulfate, or other salt, produced by the electrolytic action in the cell, accumulates about the negative electrode, and has been found to seriously interfere with the progress of the action; while the hydrogen evolved seeks the positive plate and collects, with the consequent disadvantages of polarization. The hydrogen collected about the positive plate 1 is, however, removed, together with its attendant disadvantages, by the depolarizer, which unites with the same to form water; and this water floods the cell and carries off the zinc sulfate or other salt which tends to accumulate about the negative electrode and clog the battery. The zinc sulfate or salt in solution is thus removed through the channel 4 in the negative electrode 3, and descends therethrough under the influence of gravity and the pressure imposed by the depolarizer in the vessel 25, which is subsequently opened for this purpose, and into the receptacle 26 which contains a depolarizer, as above stated. The entrance of the salt solution to the tank 26 displaces the depolarizer and causes the same to ascend into the cell, where it assists the action of the depolarizer from the vessel 25. If desired, the valve 30 may also be opened, and the zinc sulfate which is of relatively great specific gravity, may descend directly into the lowermost vessel 27, and displace the depolarizer therefrom and from the vessel 26, as just described. The zinc sulfate will, therefore, be collected in the vessel 27 and the depolarizer gradually expelled therethrough and compelled to enter the cell above, contributing its assistance to remove the hydrogen collected about the positive plate 1.

The above is substantially the operation of the improved cell, and this action is continued until the electrolyte has become exhausted from the vessel 24, and has become decomposed in the cell into the salt and water and removed to the receptacle 27.

To regenerate the cell, the container or jar 7 carrying the various parts therewith is revolved on the trunnions in the supports 17 and 18 to bring the same to the inverted position disclosed in Fig. 5. When in this position, the valve 30 is opened to permit the zinc sulfate or other salt in solution to descend into the vessel 26, the valve 23 being initially closed. Thereupon the tank 27 is charged with hydrogen under pressure through the valve 31; and the tanks 24 and 25 are also supplied through their respective valves with hydrogen which may be under pressure, but which is not necessarily so. After the vessels have been so charged, and the leads 32 and 33 connected with a source of current, the valves 23 and 30 are opened and the salt permitted to descend through the pole-piece 21 into the battery, the same being driven before the compressed hydrogen in the receptacle 27 which thereby becomes mixed therein. The valves 22 and 28 are also opened, either immediately or only after the decomposition of the salt has been going on for some time, and the hydrogen in the vessels 24 and 25 permitted to ascend through the tubular pole-piece 20 and into contact with the porous disk 3 and positive plate 1 within the cell.

As the zinc sulfate or other salt is circulated between the electrodes, the current introduced through the leads 32 and 33 will decompose the same, the zinc being dissociated from the $SO_4$ radical and becoming plated on the negative electrode 2. The radical will seek the positive plate 1, and will be there united with the hydrogen from the vessel 27 and also with that from the receptacles 24 and 25. This latter formation will restore the sulfuric acid which will descend through the tubular pole-piece 20 and into the receptacles 24 and 25, automatically displacing the hydrogen therein and causing it to ascend and assist in the further recovery of the acid.

When the regenerating operation has been completed, the cell is again revolved about its supporting members 17 and 18, and brought to the initial upright position illustrated in Fig. 4. Here the recovered acid is transferred from the receptacle 25, where the same has been collected, to the receptacle 24, and the vessels 25, 26 and 27 are again charged with oxygen or other depolarizer in readiness for the subsequent operation of the battery. It will, of course, be understood that additional electrolyte will be added from time to time to replenish the amount lost in operation, and as it becomes necessary, the electrodes 1 and 2 can be renewed by removing the heads 8 or 9 of the container 7 in an obvious manner.

Referring now more particularly to Figs. 6 and 7, I have here disclosed an improved construction and arrangement of the electrodes and container, the latter consisting of a gutta-percha cylinder 34 threaded at its ends to receive inclosing heads 35 and 36. Within the casing 34 is snugly fitted a cup-shaped positive electrode 37 inclosed at one end by a cap 38, and containing the negative electrode 39 fitted within a porous cup 40, which separates said electrodes. The negative electrode 39 is inclosed in the porous cup 40 by a disk 41 of insulating material, having a neck 42 extending through the cap 38 and head 35 for insulating the negative pole-piece 43 contained therein. The negative pole-piece 43 is constructed hollow to convey the electrolyte and depolarizer, as above described in connection with the other form of my invention, into the cell. The pole-piece 43 extends into the negative electrode 39, which is traversed by ducts 44 and 45 leading to the open end of the porous cup 40, and delivering the electrolyte and depolarizer thereto in a manner which will now be well understood.

The positive electrode 37 is connected at one end of the battery by a tubular pole-piece 46, and said pole-pieces 46 and 43 are connected by leads 32' and 33' for connection to include any appliance in circuit upon which it may be desired to furnish electricity from the battery; or said leads may connect with a source of current when the battery is to be regenerated. The positive pole-piece 46 is connected to a valve casing 22', which is in turn connected to a receptacle 24', the latter during the operation of the battery, as shown in Fig. 6, being adapted to contain an electrolyte such, for instance, as dilute sulfuric acid. To the opposite end of the receptacle 24' is a valve casing 28', similar to 22' above described, and at the opposite end of said valve casing is connected a receptacle 25' provided with a valve 29'. The receptacle 25' is adapted to contain a depolarizer, such, for instance, as gaseous oxygen under pressure, in a manner similar to that described in connection with the receptacle 25 in that form of the device shown in Fig. 4.

The negative pole-piece 43 is similarly connected to a valve casing 23', coupled at its opposite end to a receptacle 26'. 30' is a valve casing connecting the receptacle 26' with a similar receptacle 27', and 31' is a valve controlling admission to the receptacle 27'. The receptacles 26' and 27' are arranged to receive a depolarizer such, for instance, as gaseous oxygen, and this depolarizer may be contained in such receptacles under pressure or not, as may be desirable.

In operation, referring to Fig. 6, the receptacle 24' having been charged with the electrolyte and the several remaining receptacles with a depolarizer, the valves 22' and 28' are thereupon opened to permit the depolarizer to descend through the pole-piece 46 and into the battery, where it encounters the porous cup 40 and is deflected thereby along and into intimate contact with the interior wall of the positive cup-shaped electrode 37 and thence seeks a passage through said porous cup and into active engagement with the adjacent faces of the negative electrode 39. The electrolyte will thus descend by gravity, aided by the depolarizer under pressure in the receptacle 25', and will be circulated throughout the cell and will undergo electrolytic action under pressure, decomposing into hydrogen which will seek the positive electrode and radical, $SO_4$, which will be collected on the negative electrode; such electrolytic action generating a current which may be taken off through the leads 32' and 33'. The hydrogen collected at the positive plate and tending to polarize same, will be met by the oxygen from the receptacle 25', and the same will unite to form water which will relieve the positive plate of such polarization.

This action is permitted to continue until a decrease in the intensity of the current in the external circuit is felt, when the valve 23', or both said valve and the valve 30', may be opened to permit the water and congested salt in the cell to be removed through the ducts 44, 45, and through the negative pole-piece 43 into the receptacles 26' and 27', where said water and salt will displace the depolarizer therein, causing the same to ascend into the cell where it will assist the depolarizer from the tank 25'. After the pressure within the cell has been thus, to some extent, relieved, and the accumulated matter removed, the depolarizer from the tank 24' will be again free to circulate throughout the battery, and it will be found that the external circuit will immediately pick up; and if desired, the valve 23' may be then closed until the weakening of the external circuit is again felt. This action is continued with until the electrolyte and depolarizer have become exhausted, when the device will be revolved from the position shown in Fig. 6 to that shown in Fig. 7, and the operation of regeneration accomplished.

For regenerating the battery receptacle 26' is charged with salt, such as zinc sulfate formed during the operation of the battery, when in the position shown in Fig. 6, and the remaining receptacles 27', 24' and 25' are charged with gaseous hydrogen, that in the receptacle 27' being preferably under pressure. The leads 32' and 33' are connected to an external source of current, and the valve 23' opened to permit the salt to descend through the pole-piece 42, ducts 44 and 45, and into the space between the electrodes. This action will be assisted by the hydrogen under pressure by opening the valve 30', and the salt will become decomposed, due to the passage of the electric current, the zinc becoming plated on the outer faces of the negative electrode 39, while radical $SO_4$ will seek the positive electrode 37, where it will combine with the hydrogen from the receptacle 27' forming sulfuric acid.

From time to time the valve 22' may be opened and the pressure slightly relieved from the cell, permitting the sulfuric acid to descend within the receptacles 24' and 25', thus displacing the hydrogen therein, which will be compelled to ascend within the cell and add its assistance to that of the hydrogen from the receptacle 27'. This action is continued until the salt is exhausted from the receptacle 26', and the device may be revolved about its support to the position shown in Fig. 6 and the recovered acid collected in the receptacle 24', and after charging the several other receptacles with oxygen the operation of the battery may be subsequently carried on.

By the improved arrangement shown in these last-named figures of the drawings, an increased surface area is exposed between the positive and negative electrodes, and a better action is insured, productive of improved results. It will be appreciated that, in addition to the voltage produced by the chemical dissociation of the electrolyte, a reduction in counter electro-motive force is secured by the combination of the depolarizer with the free hydrogen at the positive plate.

It will be understood that while I have described the steps and processes of the improved method of regenerating an electric battery, and have shown and described the constructional embodiments for carrying out the invention, I do not wish to be limited to any specific form of the same except as may be required by the appended claims.

I claim:

1. The herein described method of regenerating an electric battery, which consists in supplying a salt to the battery, circulating the salt through said battery by means of hydrogen under pressure, and including the battery in an electric circuit substantially as described.

2. The herein described method of regenerating a battery, which consists in supplying a salt to the battery, mixing in the salt free hydrogen under pressure whereby the salt is circulated through the battery, and including the battery in an electric circuit, substantially as described.

3. The herein described method of regenerating an electric battery, which consists in supplying to the battery a salt, circulating the salt through the battery by means of hydrogen under pressure, including the battery in an electric circuit, and withdrawing the acid produced, substantially as described.

4. The herein described method of regenerating a battery, which consists in supplying a salt to the battery, circulating the salt by means of hydrogen under pressure, including the battery in an electric circuit, and furnishing an additional supply of hydrogen from a separate source, substantially as described.

5. The herein described method of regenerating an electric battery, which consists in supplying a salt to the battery, circulating the salt through the battery in one direction by means of hydrogen under pressure, including the battery in an electric circuit, and supplying additional hydrogen from a separate source and circulating the same through the battery in a direction opposite to the passage of the salt, substantially as described.

6. The method as herein described of regenerating an electric battery, which consists in supplying a salt to the battery through the negative electrode, circulating the salt through the battery by hydrogen under pressure, connecting the battery in an electric circuit, and supplying additional hydrogen through the positive electrode, substantially as described.

7. The herein described method of regenerating a battery, which consists in supplying a salt to the battery through the negative electrode, circulating the salt through the battery through hydrogen under pressure mixed therein, connecting the battery in an electric circuit, withdrawing the acid formed through the positive electrode, and supplying additional hydrogen through the positive electrode by displacement of the removed acid, substantially as described.

8. The herein described method of regenerating an electric battery, which consists in supplying a salt to the battery through the negative electrode, circulating the salt through the battery by means of hydrogen under pressure, connecting the battery in an electric circuit, periodically removing the acid formed through the positive electrode, and supplying additional hydrogen at atmospheric pressure through the positive electrode, substantially as described.

9. The method of regenerating an electric battery, which consists in introducing a salt through the negative electrode, circulating the salt therethrough and through the battery by gaseous hydrogen under pressure, periodically removing the pressure within the battery through the positive electrode, removing the acid formed through the positive electrode, supplying additional hydrogen through the positive electrode by displacement of the removed acid, and including the battery in an electric circuit, substantially as described.

10. The herein described method of regenerating an electric battery, which consists in introducing a salt to the inclosed battery through the negative electrode, forcing the salt therethrough by means of hydrogen under pressure, periodically relieving the pressure from the battery through the positive electrode, removing the acid formed through the positive electrode, conveying the acid to a source of additional hydrogen, displacing the hydrogen by the removed acid and compelling the same to enter the battery and circulate therethrough in a direction opposite to the passage of the salt, and including the battery in an electric circuit, substantially as described.

In testimony whereof, I affix my signature.

PHILIP A. EMANUEL.